UNITED STATES PATENT OFFICE 2,368,361

PRODUCTION OF HYDROXYDIPHENYLS

Russell L. Jenkins, Anniston, Ala., assignor to Monsanto Chemical Company, St. Louis, Mo., a corporation of Delaware No Drawing. Application February 18, 1942, Serial No. 431,385

8 Claims. (Cl. 260—620)

The present invention relates to processes for the production of hydroxydiphenyls by the fusion of aromatic sulfonic acids with alkali-metal hydroxides. The invention refers particularly to the production of 4-hydroxydiphenyl (p-phenylphenol) and 4,4'-dihydroxydiphenyl.

Heretofore, according to the known methods for the production of 4,4'-dihydroxydiphenyl, diphenyl was sulfonated to diphenyldisulfonic acid. The sulfonating acid was neutralized and the salt of the diphenylsulfonic acid and the salt of the sulfonating acid were separated from each other. The purified salt of diphenyldisulfonic acid was then fused with a moderate excess of potassium hydroxide or a very large excess of sodium hydroxide to produce the dihydroxydiphenyl, which was thereafter recovered from the melt. A considerable excess of sulfuric acid is required for the sulfonation. After this excess of acid is neutralized, difficulties arise in the separation of the large proportion of salt of the sulfonating acid from the salt of the diphenyldisulfonic acid. Purification of the diphenylsulfonate was essential since it is not possible to conduct economically a fusion of sulfonates in the presence of large amounts of sulfates. Such a process results in losses both of sulfonating acid in the sulfonation and of alkalies for neutralizing the unused sulfonating acid and, furthermore, includes the rather difficult separation of the salts from each other.

The principal object of the present invention is to provide an improved process of producing hydroxydiphenyls by fusion of the corresponding diphenylsulfonic acids or their salts, which process is simpler than heretofore known processes and which avoids the losses inherent in the heretofore known processes. It is a more specific object of the present invention to provide a process of converting diphenyl to diphenylsulfonic acids in which the residual sulfonating agent is not removed but is converted to products which are desirable in the succeeding fusion and which are readily recovered from the fusion products. It is also an object of the present invention to provide a process of fusing diphenyl sulfonic acids or salts thereof without the use of a large excess of sodium hydroxide or the use of potassium hydroxide or other costly alkalies. Other objects and advantages of the invention, some of which are referred to specifically hereinafter, will be apparent to those skilled in the art.

According to the preferred process of my invention, which is exemplified by the production of 4,4'-dihydroxydiphenyl, diphenyl is sulfonated with concentrated sulfuric acid to produce diphenyldisulfonic acid. This sulfonation is easily controlled to yield the 4,4'-disulfonic acid free from substantial amounts of monosulfonic acid. The reaction mixture, which contains a large excess of sulfuric acid that is somewhat diluted with water, is then heated to a higher temperature, above the boiling point of water, while benzene or a similar more readily sulfonatable aromatic hydrocarbon of relatively low boiling point is gradually added in excess to the mixture and water resulting from the reaction is continuously distilled out with the excess benzene or other hydrocarbon. This second sulfonation, which is a so-called "vapor" sulfonation and which is carried on in the presence of the diphenyldisulfonic acid already formed in the reaction mixture and in the presence of an excess of benzene or other readily sulfonatable hydrocarbon, yields benzenesulfonic acid or other aromatic monosulfonic acid. The amount of sulfuric acid remaining after this second vapor sulfonation, when the sulfonation has been conducted properly, is negligible. The mixture of sulfonic acids, namely, 4,4'-diphenyldisulfonic acid and benzenemonosulfonic acid (when benzene was the hydrocarbon used in the vapor sulfonation) and which also contains a small or negligible amount of sulfuric acid, is neutralized with sodium hydroxide, sodium carbonate or other sodium salt of a readily volatile acid, and an aqueous solution of the sodium salts is obtained. The aqueous solution of sulfonic acids is then charged in the conventional manner to a fusion kettle containing molten sodium hydroxide. The sulfonic acids are converted to sodium salts of the corresponding phenols, which may subsequently be acidified and subjected to conventional treatments to effect the separation of the phenols from each other.

In the foregoing process, as applied to the production of 4,4'-dihydroxydiphenyl, the following advantages are to be noted. These results, most of which were unexpected, apply in general to the production of other diphenyl sulfonic acids and hydroxydiphenyls according to my process.

1. The excess sulfuric acid that remains after sulfonation of the diphenylsulfonic acid is substantially completely consumed in the succeeding vapor sulfonation of benzene or other sulfonatable aromatic hydrocarbon of relatively low boiling point.

2. The amount of sulfuric acid remaining after the vapor sulfonation is substantially negligible and does not interfere in the subsequent fusion.

3. No separation of the sulfonic acids or their salts from each other or from sulfuric acid or sulfates is necessary.

4. There is substantially no further sulfonation or conversion of the diphenyldisulfonic acid to monosulfonic or trisulfonic or higher polysulfonic acids or sulfones. The succeeding vapor sulfonation does not have any substantial effect on the products already formed.

5. The presence of the diphenyldisulfonic acid in the sulfonation mixture has no substantial effect on the succeeding vapor sulfonation of benzene or other readily sulfonatable hydrocarbon of relatively low boiling point. It does not substantially increase or decrease the amount of diphenylsulfone which would be formed if the diphenyldisulfonic acid were absent.

6. The presence of the benzenesulfonic acid or salt thereof in the diphenyldisulfonic acid or salt thereof is decidedly advantageous in the fusion since it renders unnecessary the use of potassium hydroxide, either as the only alkali or as a substantial component of the alkali fusion reaction mass. The fusion can be conducted solely with sodium hydroxide and that in a proportion which did not heretofore yield satisfactory fusions.

7. The recovery of phenol, for example, from admixtures with 4,4'-dihydroxydiphenyl is much simpler than the recovery of 4,4'-diphenyldisulfonic acid or its salts from sulfuric acid or its salts.

As an example of a preferred method of producing 4-hydroxydiphenyl and 4,4'-dihydroxydiphenyl, according to the processes of my invention, the following are typical of a number of runs carried out under somewhat varied conditions.

EXAMPLE 1

A. *Sulfonation of diphenyl*

To 154 grams (1 mol) of diphenyl contained in a suitable glass vessel is added gradually, over the course of about 10 to 15 minutes, 450 grams of 98% sulfuric acid (sp. gr. 1.84, corresponding to about 4.5 mol), while stirring is maintained. After the sulfuric acid has been added and while stirring continually, the reaction mixture is heated until it reaches 150° C. and is maintained at that temperature for about 2½ hours. The product consists of approximately 41.5% of 100% sulfuric acid, 7% of water, and 51.5% diphenyldisulfonic acid.

The glass vessel containing the sulfonation mass is then provided with a water-cooled downward condenser arranged so as to condense water and benzene volatilized in the subsequent reaction. To the sulfonation mass, while the mixture is maintained at 150° C. and stirred, liquid benzene is then added gradually in small portions, or vaporized benzene is bubbled through the reaction mixture. The unreacted benzene and water pass to the condenser, are condensed and are separated from each other in a separatory funnel or in a continuous separator and the benzene is returned as part of the charging stock to the sulfonation mixture. An excess of benzene over that which can be converted to benzenemonosulfonic acid is supplied. The progress of the reaction can be followed by analyses of total acidity of the reaction mixture or of residual sulfuric acid by conventional methods. Slightly higher temperatures of sulfonation may be used but generally, with benzene, the preferred temperature is slightly below about 160° C. since at that temperature the sulfonation can be conducted substantially to completion. However, no attempt should be made to effect complete sulfonation since the percentage of diphenylsulfone and other by-products may increase substantially toward the end of the sulfonation. When the unconsumed sulfuric acid corresponds to about 0.5% of 100% sulfuric acid ($H_2SO_4$), the sulfone content will be about 6%, but only about 2% sulfone is present when the sulfonation is stopped at a point corresponding to about 1.3% unconsumed 100% sulfuric acid in the mixture. The product at this point, depending upon the extent to which the vapor sulfonation of benzene has been carried, will correspond to approximately the following analysis:

| | Per cent |
|---|---|
| Diphenyldisulfonic acid | 41 to 43 |
| Benzenesulfonic acid | 51 to 53 |
| Sulfuric acid (100%) | 0.5 to 4.5 |
| Diphenylsulfone | 0.6 to 6 |

B. *Fusion*

The sulfonation mixture obtained above is neutralized carefully with aqueous sodium hydroxide solution, sodium carbonate, or sodium sulfite in aqueous slurry. An excess of sodium hydroxide may be used, if desired, but sodium sulfite is the preferred neutralizing agent and is preferably used in slight excess. The solution comprising the sodium sulfonates, if too dilute after neutralization, may be concentrated by evaporation. The sodium sulfonates may be used in the form of an aqueous solution, slurry, paste or in dry solid form in the succeeding fusion.

To a fusion kettle of nickel or other suitable material containing about 65 to 90 grams or more of sodium hydroxide maintained at a temperature of about 280° C., is added, while the melt is stirred, the neutralized solution, slurry, paste or powder comprising the sodium salts of the sulfonic acids, in an amount that corresponds to about 100 grams of dry sodium sulfonates. About 1 hour is required for this addition. The fusion mass is then gradually heated to about 350° to 370° C. over the course of about another hour and is maintained at that temperature for about an additional hour.

In contrast to fusions in which no benzenesulfonate was present with the diphenylsulfonate, the molecular ratio of sodium hydroxide to sulfonic acid groups ($-SO_3H$) required to obtain satisfactory fusion was about 7 to 1, whereas according to my process between 3 to 1 and 4 to 1 and generally, about 3.5 to 1, are satisfactory. Sodium diphenyldisulfonate, when fused with sodium hydroxide, requires 14 mols of sodium hydroxide per mol of sodium diphenyldisulfonate to obtain satisfactory fusion. Sodium benzenesulfonate alone requires about 2.25 or more mols of sodium hydroxide per mol. The reactions theoretically require but 2 mols of sodium hydroxide for each sulfonic acid group.

C. *Recovery of phenols*

The fusion mass obtained above is quenched in water in an amount sufficient to dissolve completely the sodium salts of the phenols. If sodium sulfite remains undissolved, it is filtered from the solution. The filtrate is then acidified with sulfuric acid or other mineral acid and the precipitated 4,4'-dihydroxydiphenyl is separated by filtration. Phenol is extracted from the aqueous filtrate with benzene.

The 4,4'-dihydroxydiphenyl crystals obtained are dissolved in ethyl alcohol and the solution is filtered. The purified 4,4'-dihydroxydiphenyl is then recovered from the filtrate by evaporation of the solvent. It may be further purified by fractional distillation, at atmospheric pressure or in vacuum, if a product of greater purity is desired.

Phenol is recovered from the benzene extracts by evaporating off the extractant, benzene. It may be further purified by fractional distillation.

Because of the differences in boiling points (180° C. for phenol and 340° to 360° C. for the dihydroxydiphenyl) the products which can be obtained on fractional distillation are of a high degree of purity.

EXAMPLE 2

To 308 grams (2 mols) of diphenyl contained in a suitable glass vessel is added gradually 250 cc. (458 grams) of concentrated sulfuric acid (sp. gr. 1.83, corresponding to about 4.5 mols), with stirring. The reactants are present in the proportion of about 2.25 mols of sulfuric acid to 1 mol of diphenyl. After the sulfuric acid has been added, and while being continually stirred, the reaction mixture is heated until it reaches about 82° C. The mixture is maintained at approximately 82° C. to 110° C. for about 1 hour. The reaction product consists of approximately 62.6% of diphenylsulfonic acid, 4.8% of water and 32.6% of 100% sulfuric acid.

To this sulfonation mixture is then added benzene as in Example 1 and the procedure for consuming the residual sulfonic acid contained in the reaction mixture by vapor sulfonation of benzene is followed.

The mixture of diphenylsulfonic acid and benzene-sulfonic acid containing a small residual amount of sulfuric acid is then neutralized, fused with sodium hydroxide and the resulting phenols, namely, a mixture of phenol and 4-phenylphenol, are recovered and separated as in Example 1.

The process of the present invention is adapted generally to the production of hydroxydiphenyls containing one or more hydroxyl groups in the molecule and to alkyl-substituted and aryl-substituted hydroxydiphenyls by fusion of the corresponding diphenylsulfonic acids or their salts, particularly sodium salts, with sodium hydroxide. Instead of using benzene to consume the sulfuric acid remaining after the sulfonation of the diphenyl hydrocarbon compound, other aromatic hydrocarbons of relatively low boiling point (below about 200° C. and preferably below about 160° C.) such as toluene or the xylenes, ethylbenzene, or mixtures thereof may be used. In such a case, besides the hydroxydiphenyl, the fusion mixture will comprise sodium salts of cresols, xylenols, etc., which are readily separated from the hydroxydiphenyls. The method of vapor sulfonation of benzene or other hydrocarbon of relatively low boiling point is known to the art and is described, for example, in U. S. Patent No. 1,210,725. It is also within the purview of the present invention to add to the mixture of sulfonic acids undergoing fusion either a phenol other than the hydroxydiphenyl which will be formed in the fusion or a salt of such a phenol, or an aromatic sulfonic acid or salt thereof which will yield such a phenol in the fusion.

In the sulfonation procedure, the concentration of sulfuric acid and the temperatures of sulfonation may be varied considerably. Thus in the sulfonation of diphenyl to produce diphenyldisulfonic acid, oleum or fuming sulfuric acids of various strengths may be used by modifying the temperature and conditions of sulfonation. It is not necessary to drive the sulfonation to completion, that is, to a point at which no further sulfonation can be achieved with the particular residual acid under the particular conditions. The sulfonation of the diphenyl may be stopped short of this since the excess acid will be for the most part consumed in the subsequent sulfonation with benzene or other sulfonatable aromatic hydrocarbon.

Likewise, it is not necessary to drive to completion the sulfonation of the benzene or other aromatic hydrocarbon, since a moderate excess of sulfates in the fusion reaction will not be seriously detrimental. In the second sulfonation, therefore, the exact conditions of vapor sulfonation specified in the examples may be varied somewhat although it is desirable that most of the water be continuously driven out of the sulfonation mixture during the second sulfonation. Small amounts of water which remain in the reaction mixture will not be greatly detrimental to the yield of product, however, and any moderate amount of sulfates remaining in the neutralized sulfonation mixture as a result will not be seriously detrimental in the fusion. The second sulfonation is conducted preferably under such conditions that the yield of diphenylsulfone and other by-products is maintained at a low proportion. This can generally be effected by keeping the sulfonation temperature low (not much above 160° C., and preferably at 150° C. or within the range of 130° to 150° C.) and stopping reaction when the residual sulfuric acid is substantially less than 5% of the total reaction mixture. The second sulfonation may also be varied in other manners known to the art for the purpose of obtaining more complete removal of the water of reaction and more complete consumption of the residual sulfuric acid.

Although the mixtures of sulfonic acids obtained according to the processes of this invention are specifically adapted for fusion with sodium hydroxide to provide the corresponding phenols, it is within the purview of the invention to use potassium hydroxide or other alkali-metal hydroxides or mixtures with each other or with sodium hydroxide in the fusion mass.

Inasmuch as the foregoing description comprises preferred embodiments of my invention, it is to be understood that these are merely exemplary and that changes and modifications may be made therein without departing substantially from the scope of the invention which is defined in the appended claims.

I claim:

1. The process of producing a 4-hydroxydiphenyl which comprises the sulfonation of a diphenyl with concentrated sulfuric acid to form a 4-diphenylsulfonic acid, consuming the predominant portion of residual sulfuric acid present in the sulfonation mixture by passing an excess of benzene-hydrocarbon vapors therethrough to react with the excess sulfuric acid and form a benzene sulfonic acid, removing water vapor and benzene hydrocarbon vapors from the sulfonation mixture during the reaction between the sulfuric acid and benzene hydrocarbon, converting the sulfonation products to the alkali-metal salts, fusing said alkali-metal salts with an alkali-metal hydroxide and thereafter recovering the phenols from the fusion mass and separating the 4-hydroxydiphenyl from the other phenols formed in the process.

2. The process of producing a 4-hydroxydiphenyl which comprises the sulfonation of diphenyl with concentrated sulfuric acid at a temperature not in excess of about 150° C., to form a 4-diphenylsulfonic acid, consuming the predominant portion of the residual sulfuric acid present in the sulfonation mixture by passing an excess of benzene vapors therethrough at a temperature within the range of approximately 130 to 160° C. to react with the excess sulfuric acid and form benzenesulfonic acid, removing benzene and water vapors from the sulfonation mixture during the reaction between the benzene and excess sulfuric acid, converting the sulfonation products to the sodium salts, fusing said sodium salts with sodium hydroxide and thereafter recovering the phenols from the fusion mass and separating the 4-hydroxydiphenyl from the phenol formed in the process.

3. The process of producing 4-hydroxydiphenyl which comprises the sulfonation of diphenyl with concentrated sulfuric acid at a temperature not in excess of about 110° C. for about one hour, to form 4-diphenylsulfonic acid, consuming the predominant portion of the residual sulfuric acid present in the sulfonation mixture by passing an excess of benzene vapors therethrough at a temperature within the range of approximately 130 to 160° C. to react with the excess sulfuric acid and form benzenesulfonic acid, removing benzene and water vapors from the sulfonation mixture during the reaction between the benzene and excess sulfuric acid, converting the sulfonation products to the sodium salts, fusing said sodium salts with sodium hydroxide and thereafter recovering the phenols from the fusion mass and separating 4-hydroxydiphenyl from the phenol formed in the process.

4. The process of producing 4,4'-dihydroxydiphenyl which comprises the sulfonation of diphenyl with concentrated sulfuric acid at a temperature not in excess of about 150° C. for about 2½ hours to form 4,4'-diphenyldisulfonic acid, consuming the predominant portion of the residual sulfuric acid present in the sulfonation mixture by passing an excess of benzene vapors in contact with the sulfonation mixture to react with the excess sulfuric acid and form benzene sulfonic acid without the further sulfonation of the diphenyl, removing benzene and water vapors from the sulfonation mixture during the reaction between the benzene and sulfuric acid, converting the sulfonation products to the sodium salts, fusing said sodium salts with sodium hydroxide, and thereafter recovering the phenols from the fusion mass and separating 4,4'-dihydroxydiphenyl from phenol formed in the process.

5. The process of producing 4,4'-dihydroxydiphenyl which comprises the sulfonation of diphenyl at a temperature of approximately 150° C. for about 2½ hours with concentrated sulfuric acid to form 4,4'-diphenyldisulfonic acid, consuming the predominant portion of the residual sulfuric acid present in the sulfonation mixture by passing an excess of benzene vapors in contact with the sulfonation mixture at a temperature of approximately 130 to 160° C. to form benzene sulfonic acid, removing benzene and water vapors from the sulfonation mixture during the reaction between the benzene and excess sulfuric acid, converting the sulfonation products to sodium salts, fusing said sodium salts with sodium hydroxide and thereafter recovering the phenols from the fusion mass and separating 4,4'-dihydroxydiphenyl from phenol formed in the process.

6. In the process of producing 4,4'-dihydroxydiphenyl, the steps comprising sulfonating diphenyl with concentrated sulfuric acid at a temperature not in excess of 150° C. for about 2½ hours, consuming all but about 1.3% of the residual sulfuric acid present in the sulfonation mixture by passing an excess of benzene vapors in contact with the sulfonation mixture at a temperature of approximately 130 to 160° C. to react with the excess sulfuric acid and form benzenesulfonic acid, removing benzene and water vapors from the sulfonation mixture during the reaction between the benzene and sulfuric acid, converting the sulfonation products to the sodium salts, fusing said sodium salts with sodium hydroxide and thereafter recovering the phenols from the fusion mass and separating 4,4'-dihydroxydiphenyl from phenol formed in the process.

7. In the process of producing 4,4'-dihydroxydiphenyl, the steps comprising sulfonating diphenyl at a temperature of approximately 150° C. for about 2½ hours with concentrated sulfuric acid to form 4,4'-diphenylsulfonic acid, consuming all but about 1.3% of the residual sulfuric acid present in the sulfonation mixture by passing an excess of benzene vapors in contact with the sulfonation mixture at a temperature of approximately 130 to 160° C. to react with the excess sulfuric acid and form benzenesulfonic acid, removing benzene and water vapors from the sulfonation mixture during the reaction between the benzene and sulfuric acid, converting the sulfonation products to the sodium salts, fusing said sodium salts with sodium hydroxide and thereafter recovering the phenols from the fusion mass and separating 4,4'-dihydroxydiphenyl from phenol formed in the process.

8. The process of producing 4,4'-dihydroxydiphenyl which comprises sulfonating diphenyl with fuming sulfuric acid at a temperature not in excess of 150° C. for about 2½ hours to form 4,4'-diphenylsulfonic acid, consuming the predominant portion of the residual sulfuric acid present in the sulfonation mixture by passing an excess of benzene vapors in contact with the sulfonation mixture at a temperature of approximately 130 to 160° C. to form benzene sulfonic acid, removing benzene and water vapors from the sulfonation mixture during the reaction between the benzene and excess sulfuric acid, converting the sulfonation products to sodium salts, fusing said sodium salts with sodium hydroxide and thereafter recovering the phenols from the fusion mass and separating 4,4'-dihydroxydiphenyl from phenol formed in the process.

RUSSELL L. JENKINS.